US010926635B2

United States Patent
Kim et al.

(10) Patent No.: US 10,926,635 B2
(45) Date of Patent: Feb. 23, 2021

(54) VEHICLE INCLUDING COMMUNICATION SYSTEM FOR DISABLED PERSON AND CONTROL METHOD OF COMMUNICATION SYSTEM FOR DISABLED PERSON

(71) Applicants: Hyundai Motor Company, Seoul (KR); Kia Motors Corporation, Seoul (KR)

(72) Inventors: Jong Won Kim, Chungcheongnam-do (KR); Seong Hyeon Lee, Busan (KR); Oh Sol Kwon, Busan (KR); Joo Hwan Lee, Seoul (KR); Hyeong Jun Park, Gyeonggi-do (KR); Ji In Jung, Gyeongsangbuk-do (KR); Jun Young Kwon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 118 days.

(21) Appl. No.: 16/155,294

(22) Filed: Oct. 9, 2018

(65) Prior Publication Data
US 2019/0315227 A1 Oct. 17, 2019

(30) Foreign Application Priority Data
Apr. 17, 2018 (KR) .......................... 10-2018-0044633

(51) Int. Cl.
*B60K 35/00* (2006.01)
*G06K 9/00* (2006.01)
(Continued)

(52) U.S. Cl.
CPC .............. *B60K 35/00* (2013.01); *G06F 3/167* (2013.01); *G06K 9/00355* (2013.01);
(Continued)

(58) Field of Classification Search
CPC ................ B60K 35/00; B60K 9/00355; B60K 2370/146; G09B 21/009; G10L 15/22; G10L 15/26
See application file for complete search history.

(56) References Cited

U.S. PATENT DOCUMENTS

| 2007/0043503 A1* | 2/2007 | Oesterling | ............. G01C 21/00 701/431 |
| 2008/0144781 A1* | 6/2008 | Liebermann | ......... G09B 21/001 379/52 |

(Continued)

FOREIGN PATENT DOCUMENTS

| JP | 2003-141547 | * | 5/2003 |
| KR | 20160125024 A | | 10/2016 |

*Primary Examiner* — Michael J Zanelli
(74) *Attorney, Agent, or Firm* — Mintz Levin Cohn Ferris Glovsky and Popeo, P.C.; Peter F. Corless (57) ABSTRACT

A vehicle including a communication system for a disabled person may include: a motion capture unit that recognizes sign language of a passenger of the vehicle; an input unit that receives a voice or characters from the passenger; a database that stores sign language information; a control unit that is communicatively coupled to the motion capture unit and the input unit, the control unit being configured to translate the sign language recognized by the motion capture unit using the sign language information stored in the database, and to convert a voice received through the input unit into characters; and an output unit that is communicatively coupled to the control unit, the output unit being configured to output the sign language translated by the control unit as a voice or characters, and to output the voice converted by the control unit as characters.

12 Claims, 7 Drawing Sheets

(51) Int. Cl.
   *G10L 15/22* (2006.01)
   *G09B 21/00* (2006.01)
   *G06F 3/16* (2006.01)

(52) U.S. Cl.
   CPC ....... *G06K 9/00845* (2013.01); *G09B 21/009* (2013.01); *G10L 15/22* (2013.01); *B60K 2370/146* (2019.05); *B60K 2370/148* (2019.05); *B60K 2370/15* (2019.05); *G10L 2015/223* (2013.01)

(56) References Cited

U.S. PATENT DOCUMENTS

| | | | |
|---|---|---|---|
| 2009/0313013 A1* | 12/2009 | Wen | G09B 21/009 704/235 |
| 2012/0275642 A1* | 11/2012 | Aller | G06F 3/04886 382/100 |
| 2014/0171036 A1* | 6/2014 | Simmons | H04M 1/72591 455/414.1 |
| 2015/0121215 A1* | 4/2015 | Wohlert | G06F 9/453 715/706 |
| 2016/0379423 A1* | 12/2016 | Nagata | B60R 16/0234 701/31.5 |
| 2017/0236450 A1* | 8/2017 | Jung | G09B 21/009 704/3 |
| 2017/0243318 A1* | 8/2017 | Aller | G06T 1/005 |
| 2019/0204931 A1* | 7/2019 | Groh | G06K 9/00832 |

\* cited by examiner

VEHICLE INCLUDING COMMUNICATION SYSTEM FOR DISABLED PERSON AND CONTROL METHOD OF COMMUNICATION SYSTEM FOR DISABLED PERSON

CROSS-REFERENCE TO RELATED APPLICATION

The present application claims the benefit of priority to Korean Patent Application No. 10-2018-0044633, filed on Apr. 17, 2018 in the Korean Intellectual Property Office, the entire contents of which are incorporated herein for all purposes by reference.

BACKGROUND OF THE DISCLOSURE

1. Technical Field

The present disclosure relates to a vehicle including a communication system for a disabled person and a method of controlling the communication system. More particularly, the present disclosure relates to a vehicle including a communication system for a disabled person that enables communication between a non-disabled person and a deaf-mute person, and to a method of controlling the communication system.

2. Description of the Prior Art

Currently, many disabled people drive or ride in vehicles for transportation. Since most convenience-related functions of vehicles are provided for non-disabled people, however, disabled people are frequently inconvenienced when driving or riding in a vehicle.

For example, when a deaf-mute person is in a vehicle owned by a non-disabled person, they have to communicate with each other using sign language. Problematically, most non-disabled people cannot understand sign language, and even if they can, it is unsafe to drive and use sign language simultaneously.

Further, when a problem occurs with the vehicle, many vehicles inform the driver of the problem by generating an alarm. However, deaf-mute people cannot hear the alarm, so they have difficulty in recognizing whether there is a problem with the vehicle. Accordingly, they can be exposed to unsafe conditions.

SUMMARY OF THE DISCLOSURE

An aspect of the present disclosure is to provide a vehicle including a communication system for a disabled person that enables smooth communication between non-disabled people and deaf-mute people and further enables deaf-mute people to easily recognize whether there is a problem in the vehicle by visually outputting whether there is a problem in a vehicle through a display, etc., and a method of controlling the communication system.

In accordance with embodiments of the present disclosure, a vehicle including a communication system for a disabled person may include: a motion capture unit that recognizes sign language of a passenger of the vehicle; an input unit that receives a voice or characters from the passenger; a database that stores sign language information; a control unit that is communicatively coupled to the motion capture unit and the input unit, the control unit being configured to translate the sign language recognized by the motion capture unit using the sign language information stored in the database, and to convert a voice received through the input unit into characters; and an output unit that is communicatively coupled to the control unit, the output unit being configured to output the sign language translated by the control unit as a voice or characters, and to output the voice converted by the control unit as characters.

The vehicle may further include a terminal including: a terminal motion capture unit that recognizes the sign language of the passenger, a terminal input unit that receives the voice or characters from the passenger, and a terminal output unit that outputs the voice or characters.

The terminal may be a mobile terminal of the passenger and may be communicatively coupled to the control unit.

The control unit may translate sign language recognized by the terminal using the sign language information stored in the database and may convert a voice input through the terminal into characters.

The control unit may output sign language recognized and translated by the terminal as a voice or characters through the output unit.

The vehicle may include a plurality of terminals. In this case, the control unit may control the output unit so as to output sign language recognized and translated by one terminal among the plurality of terminals as a voice or characters.

The control unit may control the terminal so as to output a voice or characters input through the input unit as characters.

The vehicle may include a plurality of terminals. In this case, the control unit may control the output unit so as to output a voice recognized and converted by one terminal among the plurality of terminals as a voice or characters.

The vehicle may include a plurality of terminals. In this case, the control unit may communicate with one or more specific terminals among the plurality of terminals.

The vehicle may further include a malfunction sensing unit that senses whether there is malfunction in the vehicle.

When the malfunction sensing unit senses the malfunction of the vehicle, the control unit may control the output unit so as to visually output information of the malfunction.

Furthermore, in accordance with embodiments of the present disclosure, a method of controlling a communication system for a disabled person in a vehicle may include: recognizing, by a motion capture unit of the vehicle or a mobile terminal of the passenger, sign language of a passenger of the vehicle; receiving, by an input unit of the vehicle or the mobile terminal, a voice or characters from the passenger; translating, by a control unit of the vehicle, the sign language using sign language information stored in a database; converting, by the control unit, the received voice into characters; outputting, by an output unit of the vehicle or the mobile terminal, the translated sign language as a voice or characters; and outputting, by the output unit or the mobile terminal, the converted voice as characters.

According to embodiments of the present disclosure, since the control unit translates sign language recognized and transmitted by the motion capture unit, using the sign language information stored in the database, and converts a voice input and transmitted by an input unit into characters and outputs the characters as a voice or characters through an output unit of the vehicle or a terminal, communication between a non-disabled person and a deaf-mute person can be facilitated.

Further, since the malfunction sensing unit can sense a malfunction in a vehicle, and the output unit can visually output information of the malfunction, a deaf-mute person can easily recognize the malfunction while driving the vehicle.

BRIEF DESCRIPTION OF THE DRAWINGS

The above and other aspects, characteristics and advantages of the present disclosure will be more apparent from the following detailed description taken in conjunction with the accompanying drawings, in which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus comprising the control unit in conjunction with one or more other components, as would be appreciated by a person of ordinary skill in the art.

A vehicle including a communication system for a disabled person according to embodiments of the present disclosure will be described herein with reference to the accompanying drawings.

Figure 1:
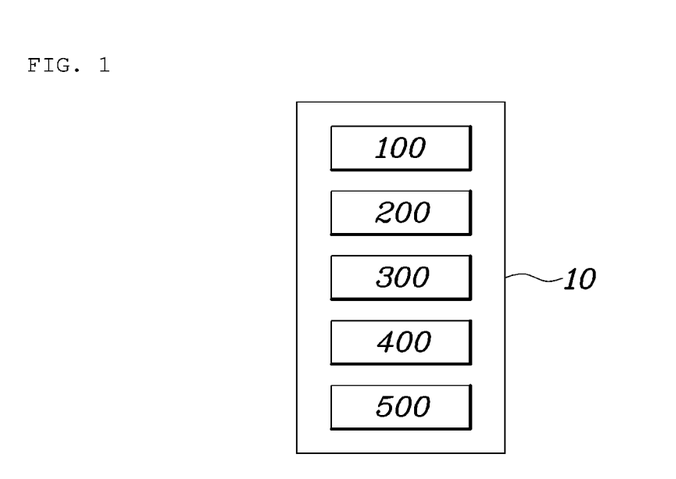
FIG. 1 is a diagram showing the configuration of a vehicle including a communication system for a disabled person according to embodiments of the present disclosure.

FIG. 1 is a diagram showing the configuration of a vehicle including a communication system for a disabled person according to embodiments of the present disclosure. As shown in FIG. 1, a vehicle 10 including a communication system for a disabled person according to embodiments of the present disclosure includes: a motion capture unit 100 that recognizes sign language of a passenger in the vehicle; an input unit 200 that receives a voice (or voices) and/or characters from the passenger; a database 300 that stores voice or character information corresponding to sign language (i.e., sign language information); a control unit 400 that is connected to the motion capture unit 100 and the input unit 200 for communication, translates sign language recognized and transmitted by the motion capture unit 100, using information in the database 300, and converts a voice (or voices) input and transmitted through the input unit 200 into characters; and an output unit 500 that is connected to the control unit 400 for communication, outputs sign language translated by the control unit 400 into voices or characters, and outputs voices, which are converted by the control unit 400, as characters.

Figure 6:
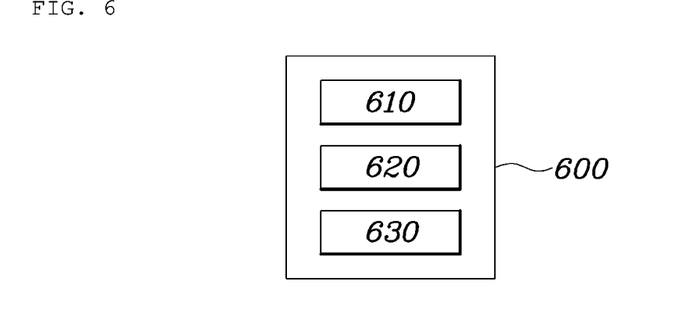
FIG. 6 is a diagram showing the configuration of a terminal for a vehicle including a communication system for a disabled person according to embodiments of the present disclosure.

In some cases, as shown in FIG. 6, the vehicle may further include one or more terminals 600 (e.g., a mobile terminal of the passenger) including a terminal motion capture unit 610 that recognizes sign language of a passenger in the vehicle, a terminal input unit 620 that receives voices or characters from the passenger, and a terminal output unit 630 that outputs voices or characters. The characteristics of the detailed configuration of the vehicle including a communication system for a disabled person according to embodiments of the present disclosure are described in detail hereafter.

The motion capture unit 100 recognizes sign language of a passenger of the vehicle. For example, the motion capture unit 100 may be a camera that can recognize sign language of a deaf-mute person, and may be provided for one or more seats in the vehicle 10. However, a camera is only one example that can be used as the motion capture unit 100 according to embodiments of the present disclosure. Various devices may be used as the motion capture unit 100 according to embodiments of the present disclosure so long as they can recognize sign language of passengers in the vehicle.

The motion capture unit 100 can recognize sign language in various ways. For example, it can recognize sign language of passengers in the vehicle on the basis of information such as the angles of hands and joints of the passengers and the distances and motion speeds of the hands and joints. Since the motion capture unit 100 is communicatively coupled to the control unit 400, it can transmit sign language recognized in the way described above to the control unit 400. Recognition of sign language by the motion capture unit 100 is not limited in this way and may be achieved in various ways.

The input unit 200 receives a voice (or voices) and/or characters from a passenger of the vehicle. For example, the input unit 200, in some cases, may be a microphone that receives voices from a passenger in the vehicle or may be an Audio, Video, and Navigation (AVN) system that can receive characters from the passenger. Since the input unit 200 is communicatively coupled to the control unit 400, it can transmit character or voice information input from the passenger to the control unit 400.

The database 300 stores voices or characters that correspond to sign language (i.e., sign language information). In detail, hand motions mean vowels or consonants in sign language, and sign language is achieved by a plurality of hand motions combined to make words or sentences. The sign language information corresponding to vowels and consonants and voices or characters corresponding to the sign language information can be stored in the database 300.

The control unit 400 is communicatively coupled to the motion capture unit 100 and the input unit 200, translates sign language recognized and transmitted by the motion capture unit 100, using the information kept in the database 300 and converts voices input and transmitted through the input unit 200 into characters. That is, the control unit 400 can translate hand motions or combinations of hand motions for sign language into corresponding words or sentences by comparing hand motions for sign language recognized by the motion capture unit 100 with hand motions for sign language stored in advance in the database 300. The control unit 400 can convert voices input through the input unit 200 from a passenger in the vehicle into characters. Because deaf-mute passengers cannot hear the voices of the non-disabled passengers, the control unit 400 converts voices input through the input unit 200 into characters to enable deaf-mute passengers to visually see characters by converting voices of non-disabled passengers into characters.

The output unit 500 is communicatively coupled to the control unit 400, outputs sign language translated by the control unit 400 as voices or characters, and outputs voices converted by the control unit 400 as characters. For example, the output unit 500 may include a speaker that can output voices in the vehicle an Audio, Video, and Navigation (AVN) system and a Head-Up Display (HUD) that can output characters.

The terminal 600 may be a mobile terminal of a passenger and may include a terminal motion capture unit 610 that recognizes sign language of a passenger in the vehicle, a terminal input unit 620 that receives voices or characters from the passenger, and a terminal output unit 630 that outputs voices or characters. That is, the terminal 600 according to embodiments of the present disclosure may be a smartphone, a PDA, a tablet, a PC, etc., that is equipped with a camera that recognizes sign language of a passenger of the vehicle, a microphone that can recognize voices of the passenger, a keypad or a touch input device that receives characters from the passenger, a speaker that outputs voices, and a display device that outputs characters. The terminal 600 can be connected to the control unit 400 for communication, so it can transmit sign language recognized by the terminal motion capture unit 610 and voice or character information input through the terminal input unit 620 to the control unit 400.

The control unit 400 can translate sign language recognized and transmitted by the terminal 600 on the basis of the sign language information stored in advance in the database 300, can convert voices input and transmitted by the terminal 600 into characters, and can output sign language recognized and translated by the terminal 600 as voices or characters through the output unit 500 of the vehicle. When there are a plurality of terminals 600, the control unit 400 can output sign language recognized and translated by one of the terminals through the output unit 500 of the vehicle or the other terminals 600 as voices or characters. Further, the control unit 400 can output characters or voices input through the input unit 200 through the terminal 600 as characters. When there are several terminals 600, the control unit 400 can output voices recognized and converted by one of the terminals through the output unit 500 of the vehicle or the other terminals 600 as characters.

When there are a plurality of terminals 600, the control unit 400 can be set such that communication is performed among specific terminals of the plurality of terminals connected to the control unit 400 for communication. For example, when a first terminal, a second terminal, and a third terminal are connected to the control unit 400 for communication, the control unit 400 can be set such that communication is performed only between the second terminal and the third terminal except for the first terminal. In this case, sign language, characters, or voices that are input through the second terminal and the third terminal may not be output through the first terminal.

Figure 2:
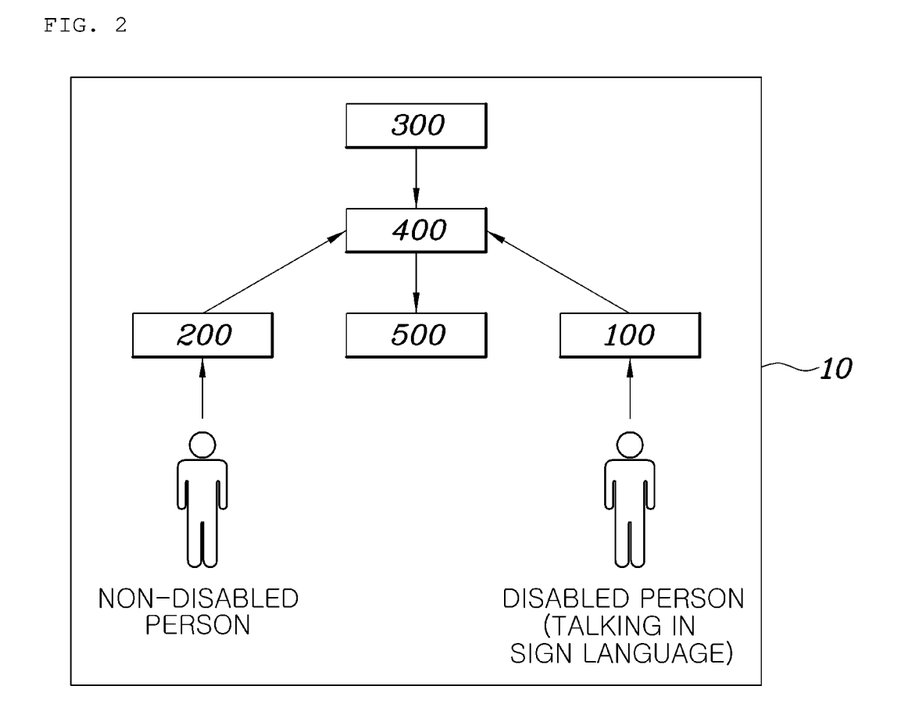
FIG. 2 is a diagram schematically showing a first example mode of operation of a communication system in a vehicle including a communication system for a disabled person according to embodiments of the present disclosure.
Figure 3:
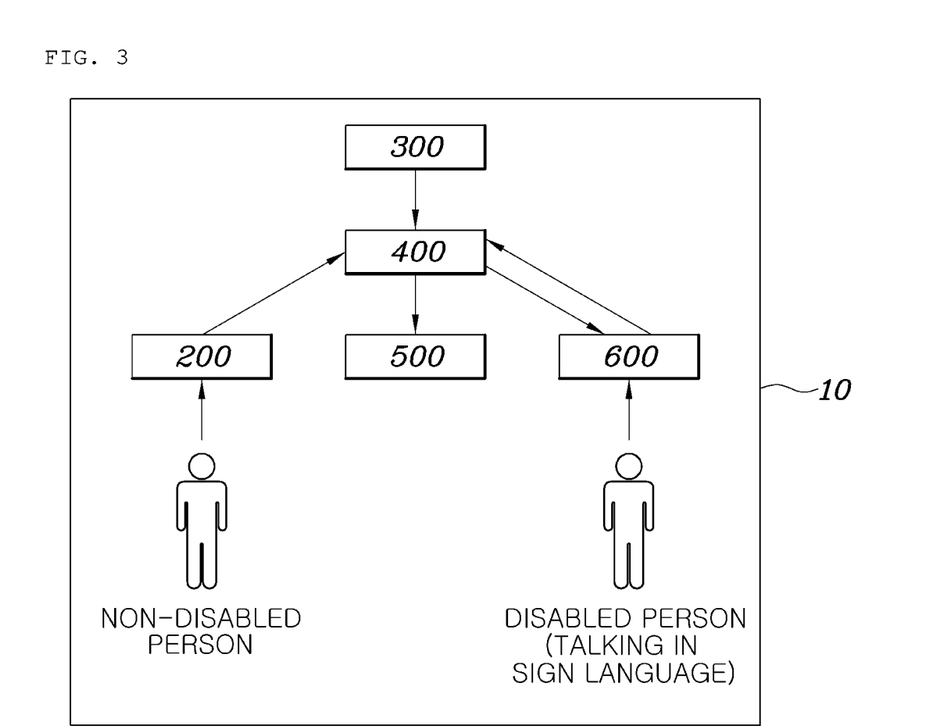
FIG. 3 is a diagram schematically showing a second example mode of operation of a communication system in a vehicle including a communication system for a disabled person according to embodiments of the present disclosure.
Figure 4:
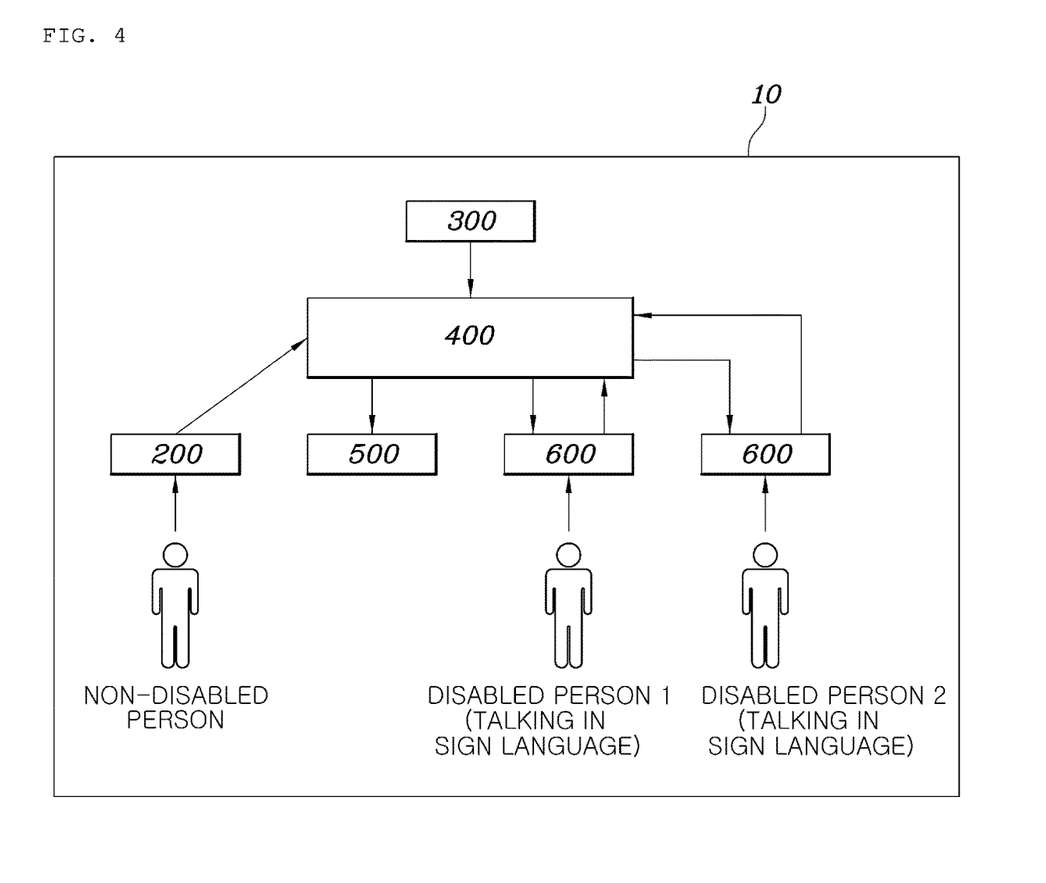
FIG. 4 is a diagram schematically showing a third example mode of operation of a communication system in a vehicle including a communication system for a disabled person according to embodiments of the present disclosure.

The operation of the communication system for a disabled person according to the present disclosure is described hereafter in detail with reference to FIGS. 2 to 4 through various example modes of operation.

In detail, FIG. 2 schematically shows a first example mode of operation of the communication system in which two passengers, including a deaf-mute person and a non-disabled person, are in a vehicle that the non-disabled person drives. As shown in FIG. 2, the control unit 400 receives a voice input from the non-disabled person through the input unit 200, and converts the voice into characters and visually outputs the characters through the output unit 500 so that the deaf-mute person can understand what the non-disabled person said. Further, the control unit 400 receives sign language of the deaf-mute person recognized by the motion capture unit 100, and translates the sign language into a voice or characters and output the voice or characters through the output unit 500 so that the non-disabled person can understand the sign language by the deaf-mute person.

According to embodiments of the present disclosure, as described above, since the control unit translates sign language of a deaf-mute person recognized and transmitted by the motion capture unit, using the sign language information in the database, and outputs the sign language as voices or characters through the output unit of the vehicle, a non-disabled person can understand the sign language by the deaf-mute person. Further, since the control unit converts voices of a non-disabled person input and transmitted from the input unit into characters and visually outputs the characters through the output unit of the vehicle, a deaf-mute person can understand what the non-disabled person said. Therefore, it is possible to enable the non-disabled person and the deaf-mute person can smoothly communicate with each other in a vehicle.

FIG. 3 schematically shows a second example mode of operation of the communication system in which two passengers, including a deaf-mute person having a mobile terminal and a non-disabled person, are in a vehicle that the non-disabled person drives. As shown in FIG. 3, the control unit 400 receives a voice input from the non-disabled person through the input unit 200, converts the voice into characters, and visually output the characters through the terminal 600 so that the deaf-mute person can understand what the non-disabled person said. Further, the control unit 400 receives sign language of the deaf-mute person recognized by the terminal 600, translates the sign language into a voice or characters, and outputs the voice or characters through the output unit 500 of the vehicle so that the non-disabled person can understand the sign language by the deaf-mute person.

FIG. 4 schematically shows a third example mode of operation of the communication system in which three passengers, including two deaf-mute people each having a mobile terminal and a non-disabled person, are in a vehicle that the non-disabled person drives. In this case, as shown in FIG. 4, the controller 400 receives a voice input from the non-disabled person through the input unit 200, converts the voice into characters, and visually outputs the characters through two terminals 600 of the deaf-mute people so that the deaf-mute people can understand what the non-disabled person said. Further, the controller 400 receives sign language of a deaf-mute person through a terminal, translates the sign language into voice or characters, and outputs the voice or characters through the output unit 500 of the vehicle or the other terminal so that communication can be smoothly performed among the three passengers.

In one example, the vehicle including a communication system for a deaf-mute person according to embodiments of the present disclosure may further include a malfunction sensing unit 700 that senses whether there is a malfunction in the vehicle. The malfunction sensing unit 700 can be connected to the control unit 400 for communication.

Figure 5:
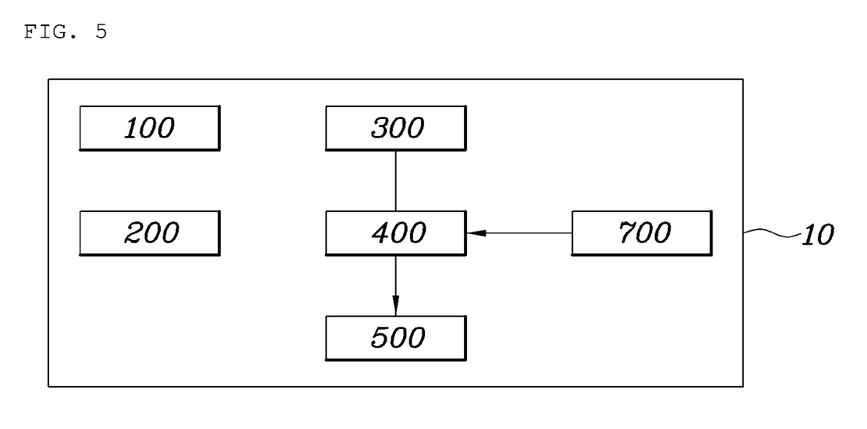
FIG. 5 is a diagram schematically showing a process in which corresponding information is output through an output unit when a problem is sensed by a malfunction sensing unit in a communication system for a disabled person according to embodiments of the present disclosure.

When a malfunction sensing unit 700 senses a malfunction of a vehicle, as shown in FIG. 5, the control unit 400 can visually output information of the malfunction through the output unit 500 of the vehicle. According to embodiments of the present disclosure, as described above, when the malfunction sensing unit senses malfunction, the control unit visually outputs information of the malfunction through the output unit of the vehicle. Thus, when a deaf-mute person drives the vehicle, he/she can easily recognize the malfunction of the vehicle.

Figure 7:
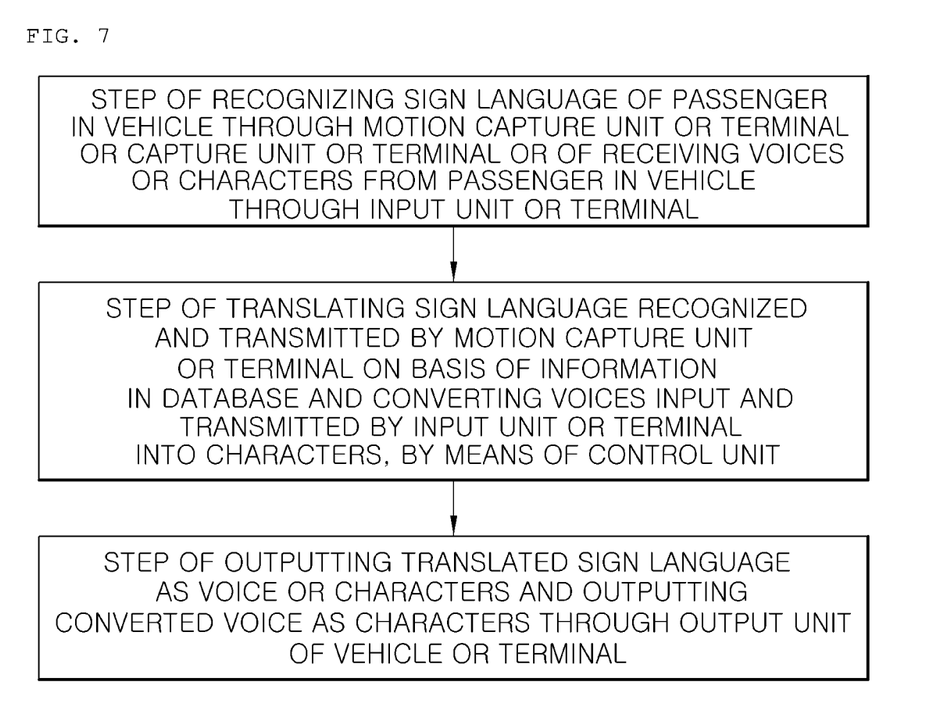
FIG. 7 is a flowchart showing a method of controlling a communication system for a disabled person according to embodiments of the present disclosure.

FIG. 7 is a flowchart showing a method of controlling the communication system for a disabled person according to embodiments of the present disclosure. As shown in FIG. 7, a method of controlling a communication system for a disabled person according to embodiments of the present disclosure may include: recognizing sign language by a passenger in a vehicle through a motion capture unit or a terminal or receiving voices or characters from the passenger in the vehicle through an input unit or a terminal; translating the sign language recognized and transmitted by the motion capture unit or the terminal on the basis of information in a database and converting voices input and transmitted the input unit or the terminal into characters, by means of a control unit; and outputting the translated sign language as a voice or characters and outputting the converted voice as characters through an output unit of the vehicle or the terminal.

The detailed technical characteristics in the steps are the same as the technical characteristics of the vehicle including a communication system for a disabled person described above, so they are not described in detail.

While the contents of the present disclosure have been described in connection with what is presently considered to be exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A vehicle including a communication system for a disabled person, the vehicle comprising:
   a motion capture unit that recognizes sign language of a passenger of the vehicle;
   an input unit that receives a voice or characters from the passenger;
   a database that stores sign language information;
   a control unit that is communicatively coupled to the motion capture unit and the input unit, the control unit being configured to translate the sign language recognized by the motion capture unit using the sign language information stored in the database, and to convert a voice received through the input unit into characters; and
   an output unit that is communicatively coupled to the control unit, the output unit being configured to output the sign language translated by the control unit as a voice or characters, and to output the voice converted by the control unit as characters,
   wherein the control unit is communicatively coupled to a plurality of terminals capable of receiving the voice or characters, outputting the voice or characters, and recognizing the sign language, and
   wherein the control unit translates the sign language recognized by one terminal among the plurality of terminals into voice or characters, and outputs the voice or characters to the output unit or one or more of the other terminals.

2. The vehicle of claim 1, further comprising a terminal including: a terminal motion capture unit that recognizes the sign language of the passenger, a terminal input unit that receives the voice or characters from the passenger, and a terminal output unit that outputs the voice or characters.

3. The vehicle of claim 2, wherein the terminal is a mobile terminal of the passenger and is communicatively coupled to the control unit.

4. The vehicle of claim 3, wherein the control unit translates sign language recognized by the terminal using the sign language information stored in the database and converts a voice input through the terminal into characters.

5. The vehicle of claim 4, wherein the control unit outputs sign language recognized and translated by the terminal as a voice or characters through the output unit.

6. The vehicle of claim 4, further comprising a plurality of terminals,
   wherein the control unit controls the output unit so as to output sign language recognized and translated by one terminal among the plurality of terminals as a voice or characters.

7. The vehicle of claim 4, wherein the control unit controls the terminal so as to output a voice or characters input through the input unit as characters.

8. The vehicle of claim 4, further comprising a plurality of terminals,
wherein the control unit controls the output unit so as to output a voice recognized and converted by one terminal among the plurality of terminals as a voice or characters.

9. The vehicle of claim 3, further comprising a plurality of terminals,
wherein the control unit communicates with one or more specific terminals among the plurality of terminals.

10. The vehicle of claim 1, further comprising a malfunction detecting sensor that senses whether there is a malfunction in the vehicle.

11. The vehicle of claim 10, wherein, when the malfunction detecting sensor senses the malfunction, the control unit controls the output unit so as to visually output information of the malfunction.

12. A method of controlling a communication system for a disabled person in a vehicle, the method comprising:

recognizing, by a motion capture unit of the vehicle or a mobile terminal of the passenger, sign language of a passenger of the vehicle;

receiving, by an input unit of the vehicle or the mobile terminal, a voice or characters from the passenger;

translating, by a control unit of the vehicle, the sign language using sign language information stored in a database into voice or characters;

converting, by the control unit, the received voice into characters;

wherein the control unit is communicatively coupled to a plurality of terminals capable of receiving the voice or characters, outputting the voice or characters, and recognizing the sign language; and translating, by the control unit, the sign language recognized by one mobile terminal among the plurality of mobile terminals into voice or characters, and output the voice or characters to an output unit or one or more of the other mobile terminals.

* * * * *